F. W. MILLER, DEC'D.
B. M. PETTINGILL & O L. MILLER, ADMINISTRATORS.
AGRICULTURAL IMPLEMENT.
APPLICATION FILED JULY 21, 1906.
980,428.
Patented Jan. 3, 1911.
4 SHEETS—SHEET 1.
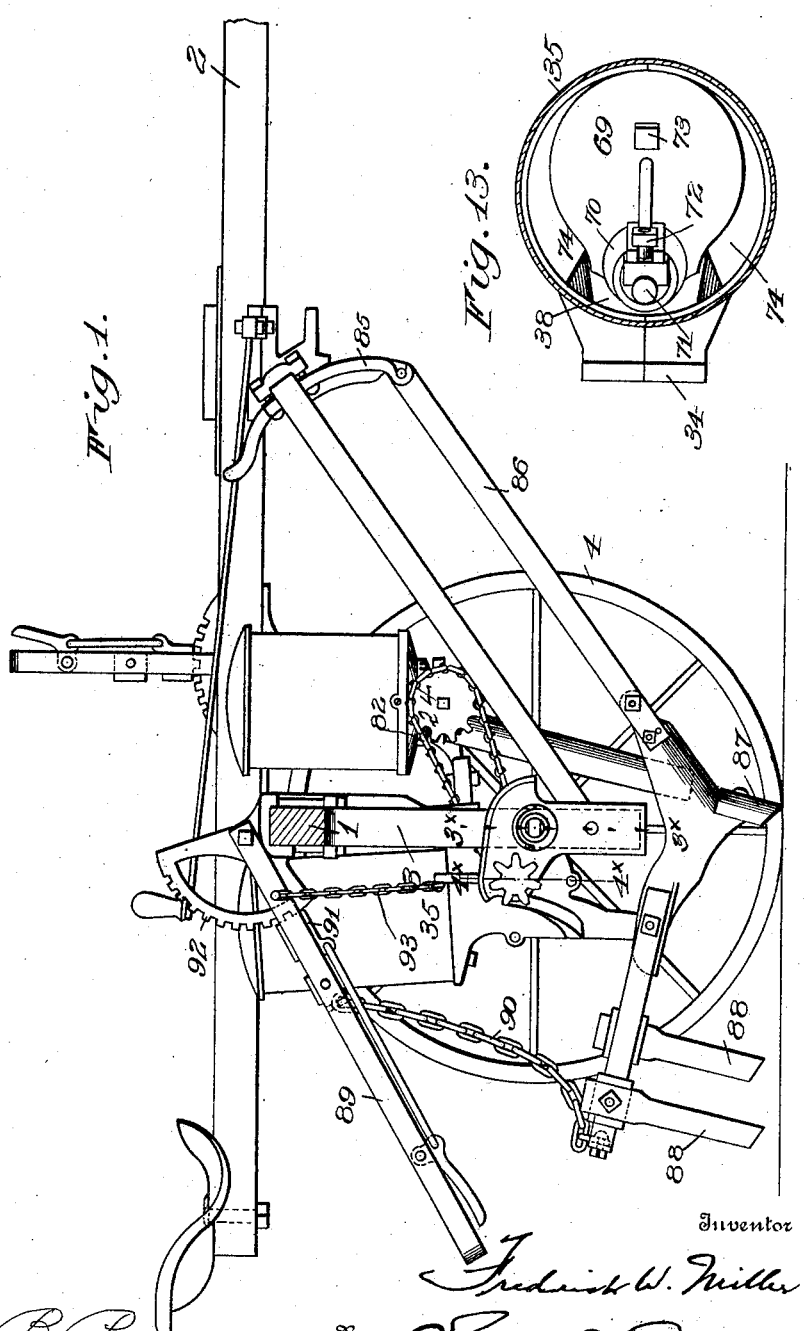

F. W. MILLER, DEC'D.
B. M. PETTINGILL & C L. MILLER, ADMINISTRATORS.
AGRICULTURAL IMPLEMENT.
APPLICATION FILED JULY 21, 1906.
980,428.
Patented Jan. 3, 1911.
4 SHEETS—SHEET 2.
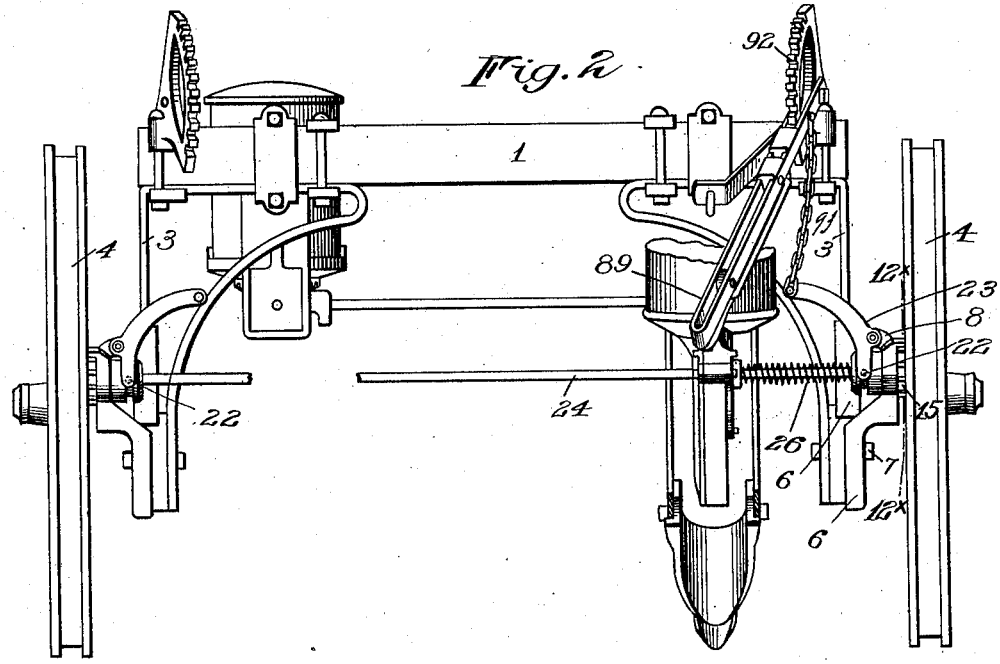
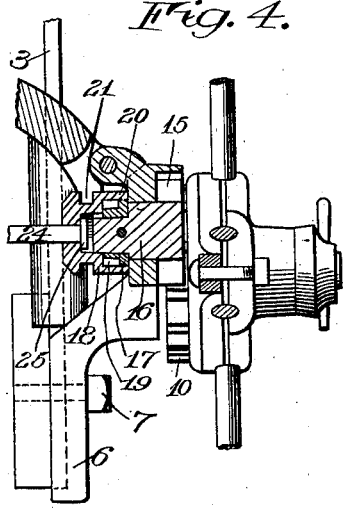
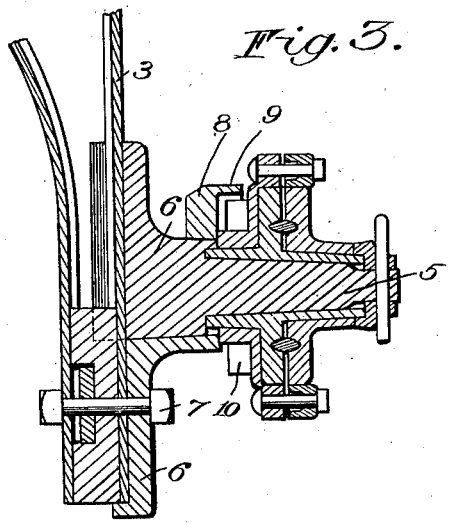

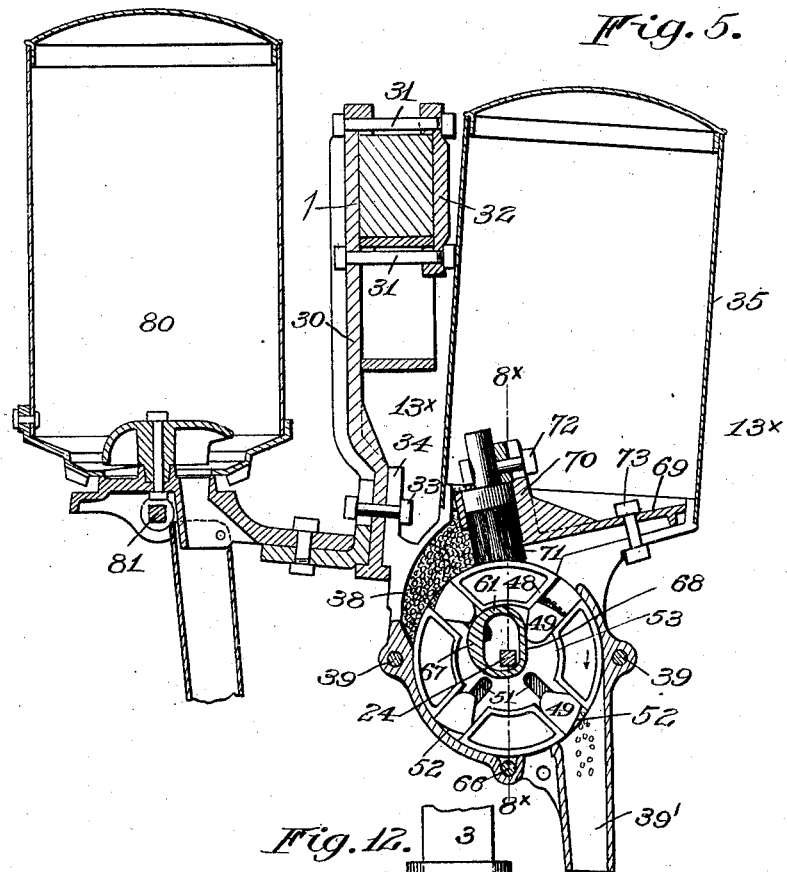

F. W. MILLER, DEC'D.
B. M. PETTINGILL & C. L. MILLER, ADMINISTRATORS.
AGRICULTURAL IMPLEMENT.
APPLICATION FILED JULY 21, 1906.
980,428.
Patented Jan. 3, 1911.
4 SHEETS—SHEET 4.
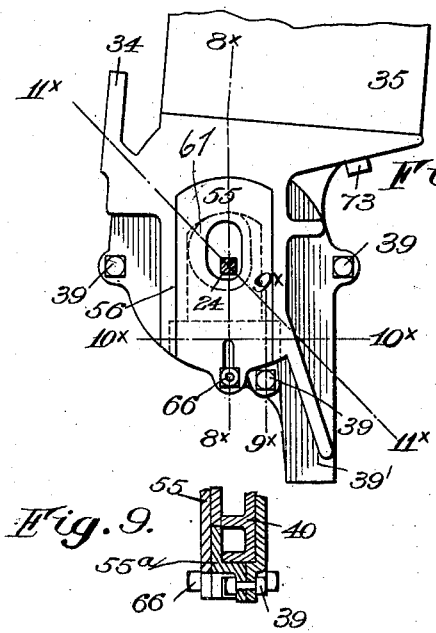
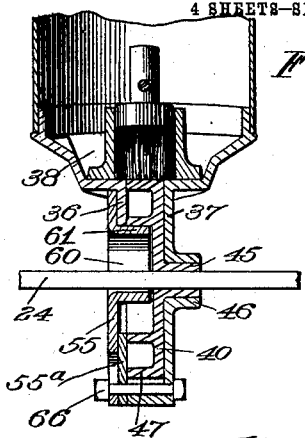
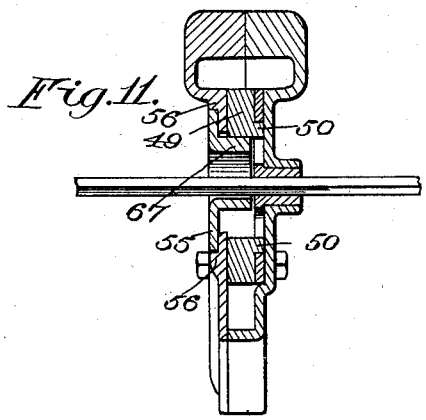
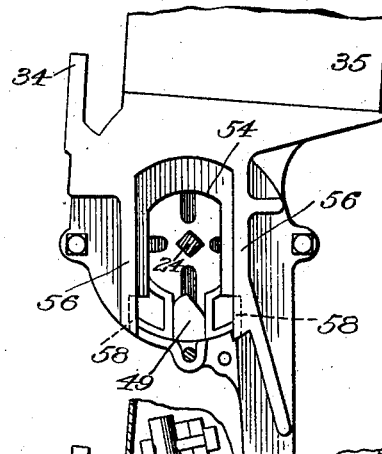
Witnesses
Walter B. Payne
Florence E. Franck
Inventor
Frederick W. Miller
By Church & Rich
his Attorneys
THE NORRIS PETERS CO., WASHINGTON, D. C.

UNITED STATES PATENT OFFICE.

FREDRICK W. MILLER, OF CALEDONIA, NEW YORK; BENJAMIN M. PETTINGILL AND CHARLOTTE L. MILLER, OF CALEDONIA, NEW YORK, ADMINISTRATORS OF SAID FREDRICK W. MILLER, DECEASED.

AGRICULTURAL IMPLEMENT.

980,428.   Specification of Letters Patent.   Patented Jan. 3, 1911.

Application filed July 21, 1906. Serial No. 327,145.

*To all whom it may concern:*

Be it known that I, FREDRICK W. MILLER, of Caledonia, in the county of Livingston and State of New York, have invented certain new and useful Improvements in Agricultural Implements; and I do hereby declare the following to be a full, clear, and exact description of the same, reference being had to the accompanying drawings, forming a part of this specification, and to the reference-numerals marked thereon.

My present invention relates to agricultural implements and it has for its object to provide a machine adapted particularly for planting seeds of large sizes such as corn and beans, the mechanism thereof being designed to distribute, or discharge, the seeds in given quantities at predetermined intervals of time, so that the plants may be conveniently cultivated by the well known hilling process.

To these and other ends the invention consists in certain improvements and combinations of parts, all as will be hereinafter more fully explained, the novel features being pointed out in the claims at the end of the specification.

In the drawings: Figure 1 is a side elevation of a machine constructed in accordance with my invention. Fig. 2 is a rear elevation thereof. Fig. 3 is a detail sectional view taken on the line 3ˣ 3ˣ of Fig. 1, showing the construction of one of the axle brackets. Fig. 4 is a similar view taken on the line 4ˣ 4ˣ of Fig. 1. Fig. 5 is a vertical section of the machine through one of the seed hoppers and the fertilizer hopper; Fig. 6 is an enlarged side elevation of a portion of the casing for the seed distributing mechanism; Fig. 7 is a similar view with the cam plate removed. Fig. 8 is a vertical sectional view taken on the line 8ˣ 8ˣ of Fig. 5. Figs. 9 and 10 are detail sectional views taken on the line 9ˣ 9ˣ and 10ˣ 10ˣ, respectively, of Fig. 6. Fig. 11 is a sectional view on the line 11ˣ 11ˣ of Fig. 6. Fig. 12 is a detail view taken on the line 12ˣ 12ˣ of Fig. 2. Fig. 13 is a horizontal sectional view of the hopper, and Fig. 14 is a vertical sectional view showing a modified construction of the feed wheel.

Similar reference numerals in the several figures indicate similar parts.

An agricultural implement constructed in accordance with my invention comprises a main frame similar in many respects to the frame of the machine shown in Letters Patent No. 677,250, granted to me June 25th, 1901, embodying a cross piece 1 to which is attached a tongue or pole 2, and downwardly-extending side pieces 3 by means of which the frame is attached to the wheels 4. In mounting the latter I employ axle pieces 5, each having at its inner end a head or bracket 6, provided with flanges which fit over the opposite edges of the adjacent side piece 3, and supported upon a bracket 6, secured by a bolt 7, having offset upwardly-extending perforated arms 8 through which the axle pieces extend. The outer edges of the arms extend outwardly, as indicated at 9, overhanging and forming a projecting covering for gear wheels 10 secured at the inner sides of the wheels, as shown in Fig. 3. The rear sides of the arms are extended and form bearings for pinions 15, as shown in Fig. 4, which are provided with laterally-extending hubs 16, carrying rings 17, which engage the inner faces of the arms and are provided with teeth. Surrounding each ring is a cup-shaped clutch member 18 provided with teeth 19, coöperating with those on the ring, beyond which projects the rim 20 which is adapted to ride upon the ends of the teeth of the ring 17 when the clutch member 18 is moved laterally to disengage its teeth therefrom. Each clutch member is provided with an annular channel 21 in which engages gimbal pins 22, carried on an operating arm 23, journaled to the arm 8 of the bracket. The clutch members 18 are arranged in alinement at opposite sides of the machine, and secured to them is a driving shaft 24, having heads 25, and extending parallel to the cross piece 1. From this arrangement of the parts it will be seen that as the implement is drawn forwardly, rotary motion is imparted to the driving shaft 24 by either, or both, of the wheels 4 resting upon the ground, and that the rotary movement of said shaft may be arrested by operating the arms 23 to move the clutch members 18 into an inoperative position against the tension of springs 26.

Arranged on the cross pieces 1, see Fig. 5, and extending downwardly therefrom are one or more brackets 30 which are adjustably secured to the cross piece by bolts 31 cooperating with the clamping plate 32, whereby it may be adjusted to any desired position on the frame. The seeding devices are supported on these brackets and secured thereto by means of a bolt 33 passing through a lug or finger 34 on one of the parts of the casing containing the seed distributing mechanism and supporting a hopper 35. The casing comprises two similarly shaped side pieces 36 and 37 flaring outwardly at their upper edges to support the hopper and form a throat 38. The two sections of the casing are secured together at various points by bolts 39 and between them is located a feed wheel 40 which is adapted to transfer the seed in given quantities from the throat 38 to the discharge passage 39'. The feed wheel is provided at one side with a laterally-extending hub 45, journaled in a bearing 46 formed on the part 37 of the casing, and at its other side it is provided with a laterally-extending peripheral flange 47 having apertures arranged equidistantly, at the edges of which are inwardly-extending radial flanges
48. The spaces between these flanges form seed pockets, and movable longitudinally therein are plungers 49 provided with laterally-extending lugs or projections 50 (Fig. 11) resting in radially-extending slots 51, which are preferably located centrally between the corresponding side walls of each pocket formed by the flanges 48. These plungers are gravity operated and travel inwardly and outwardly in their pockets during the rotation of the feed wheel. Their outer surfaces 52 are preferably curved slightly so that their rear edges, considered with reference to the direction of rotation of the feed wheel, lie below their forward edges, whereby the pockets are reduced in size to receive the minimum quantity of grain when the plungers are in their outermost position, where they are arrested by the engagement of their lugs 50 with the outer ends of the slots 51.

The construction of the feed wheel in the manner described provides it with a central recess 53 into which the inner ends of the plungers 49 project when moved inwardly in their pockets. The side 36 of the casing is provided with a large central opening 54 which is normally covered by plates 55—55ª which may be removed, as shown in Fig. 7, to permit the plungers 49 to be removed from the feed wheel and others substituted therefor, so that if it is desired to reduce the capacity of the feed wheel, other plungers provided with outer faces concentric to the periphery of the wheel and having lugs which fit the slots and engage both ends thereof may be substituted in one or more of the pockets. The cover plate 55 is supported between ribs or flanges 56, which form ways or guides therefor, and the plate 55ª, lying beneath the plate 55, is provided with laterally extending edges 57, adapted to engage in rear of shoulders 58 formed at the lower ends of the ribs. The plate 55ª is detachably held in place on the casing by one of the bolts 39 independently of the plate 55 to permit the latter to be adjusted or removed without opening the pockets in the feed wheel. The hub 45 of the feed wheel is provided with an angular aperture receiving the driving shaft 24, similarly shaped in cross section, and to accommodate this shaft the plate 55 is also provided with an elongated central aperture 60. Surrounding the latter and projecting into the recess of the feed wheel is a controlling member or cam 61 adapted to coöperate with the plungers 49 to regulate the size of the seed pockets, its vertical adjustment being accomplished by the movement of the plate 55 which is adjustable and detachably connected to the casing by a bolt 66. The cam 61 is formed as shown, in Fig. 5, with a circular side 67 which coöperates with the inner ends of the plungers to limit their inward movement on the feed wheel, as they revolve past the throat 38, and at its opposite side is flattened as indicated at 68, to permit the plungers to move inwardly, after their pockets have been filled.

The hopper 35 supported on the casing is preferably cylindrical, and in the bottom thereof is located a base plate 69 inclining downwardly, at one end, toward the throat 38 where it is provided with a collar 70 containing a brush 71, adapted to engage the periphery of the feed wheel, and supported adjustably therein by a securing device 72. This plate is secured by a bolt 73 and is adapted to support the bulk of the seeds carried in the hopper, its sides or edges being curved to form tapering passages 74 through which the seeds are conducted to the throat 38. The supporting plate permits the seeds to enter the throat, above the feed wheel, without becoming packed therein, as otherwise they will be prevented passing readily into the pockets of the wheel. Furthermore, the plate forms a convenient support for the brush 71 holding it in such a position that as the pockets leave the throat they pass beneath it, the excess seeds therein being brushed or leveled off, so that the number of seeds supplied to the pockets of a given size, may be regulated to a nicety.

In Fig. 14 I have shown a modified construction of the feed wheel in which the side walls of the pockets are formed by curved flanges 75, and between them are located plungers 76 provided with laterally-extending arms 77 having their extremities pivoted to the side of the feed wheel beneath the peripheral rim 78. These plungers are also gravity operated and their inward movement, to regulate the size of the pockets, is controlled by a cam 79, their outward movement being limited by the engagement of the arms 77 with one of the flanges 75. In instances where it is also desired to distribute fertilizing material, devices for this purpose, indicated by 80, may also be supported upon the bracket 30, in proximity to the seed distributing mechanism, as shown in Fig. 5. These devices may be operated by a shaft 81 rotated by sprocket chains, or other driving devices 82 connected to the driving shaft 24, as shown in Fig. 1.

Extending laterally from each side of the tongue or pole 2 are brackets 85 pivotally supporting the forward ends of draw bars 86 carrying at their rear ends a tool 87, for opening a furrow, and other tools, such as hoes or scrapers, 88 for closing a furrow after seed has been deposited therein. A set of these tools is located beneath each seeding mechansim, and in order to elevate the tools into an inoperative position out of engagement with the ground, levers 89 are pivoted to the cross piece 1, and are attached to the tool frame by chains or other flexible connections 90. The levers may be adjusted to regulate the depth of the furrow and to this end they are provided with locking dogs 91 coöperating with teeth of segmental racks 92. In order to arrest the movement of the seeding mechanism when the furrowing tools are elevated into the inoperative position, each of the levers 89 is attached by a connection 93 to the arms 23 so that the clutch members 18 will be disengaged from the pinions 15, when the tools are elevated.

In the agricultural implement I have illustrated as showing the preferred construction of my invention two sets of seed distributing mechanism are provided and furrowing tools which are adjustable relatively to each other for varying the distances between the rows, but it will be understood that a greater number of such devices may be employed. This adjustability of the seeding mechanism is facilitated by locating the driving shaft at a point below and at one side of the cross piece of the frame and supporting it at its ends, as I am enabled to extend a single shaft through the feed wheels without interfering with their longitudinal adjustment therein. The arrangement of the clutch members at the ends of the driving shaft provides a simple means for supporting the driving shaft and enables their operating members to be located in convenient position to be operated conjointly with the raising and lowering movement of the furrowing tools.

Seeding mechanism embodying my invention comprises few parts which are simple in form and may be readily constructed of cast metal. The construction of the casing in two separable parts facilitates applying and removing the feed wheel and the removable cam plate on one side of the casing also affords access to the seed pockets and its adjustability enables an operator to vary the capacity of the pockets.

I claim as my invention:

1. In an agricultural implement, the combination with a frame comprising a cross piece and wheels supporting it, of a shaft arranged parallel to the cross piece and driven by one of the wheels, a plurality of seed distributing mechanisms embodying hoppers adjustable longitudinally of the cross piece and feeding mechanism operated by and adjustable longitudinally of the shaft.

2. In an agricultural implement, the combination with a frame comprising a cross piece and wheels supporting it, of a shaft arranged parallel to the cross piece, driving connections between the ends of the shaft and the wheels comprising clutches and members for operating each clutch, two seed distributing mechanisms operated by said shaft, a furrow opener for each mechanism means for independently elevating them and separate connections between said means and each clutch operating member.

3. In an agricultural implement, the combination with a frame having downwardly extending side pieces, a bracket fitted thereto and having an offset upwardly extending perforated arm and an axle piece projecting through the arm to be supported by the bracket, a ground wheel journaled thereon and a gear wheel attached to the wheel, of a pinion journaled on the bracket and driving the gear wheel, seed distributing mechanism mounted on the frame, detachable driving connections between it and the pinion and means mounted on the bracket for controlling said connections.

4. In a seed distributing mechanism, the combination with a casing, a revoluble feed wheel therein provided with a central recess and a pocket leading from the recess to the periphery of the wheel, of a movable plunger in the pocket and a member coöperating with the plunger to move it located in the recess and adjustable from the exterior of the casing to vary the movement of the plunger.

5. In a seed distributing mechanism, the combination with a casing having an opening at one side, a revoluble feed wheel therein provided with a recess and having a pocket, of a movable plunger arranged in the pocket, a cam located in the recess and coöperating with the plunger and an adjustable support for the cam arranged exteriorly of the casing.

6. In a seed distributing mechanism, the combination with a casing having an opening at one side thereof, of a feed wheel provided with a recess and having a pocket, a plate on the exterior of the casing and a cam on the plate projecting through the aperture into the recess in the feed wheel and means for adjustably securing the plate to the casing.

7. In a seed distributing mechanism, the combination with a casing, a feed wheel provided with a central recess and having a pocket leading therefrom, of a driving shaft extending through the wheel and casing, a plunger movable in the pocket and a cam projecting into the recess adjustable relatively to the center of the wheel and coöperating with the plunger and means securing it to the casing.

8. In a seed distributing mechanism the combination with a casing having one side provided with an opening, a wheel journaled in the casing provided with a central recess and a pocket and a plunger fitting the pocket, of a plate closing the opening in the casing provided with an aperture, a cam on said plate surrounding the aperture and extending into the recess in the wheel and a shaft connected to the latter and extending through the aperture in the plate.

9. In a seed distributing mechanism, the combination with a casing having a bearing at one side and provided with an aperture at the other side, a wheel provided at one side with a central recess and at the other with a hub journaled in the bearing on the casing, a plunger carried on the wheel and movable inwardly and outwardly in a pocket formed thereon, a cam located in the recess controlling the movement of the plunger and a driving shaft connected to the wheel.

10. In a seed distributing mechanism, the combination with a casing having one side provided with an opening, a wheel journaled therein having a laterally extending rim provided with apertures, ribs extending inwardly from the edges of the apertures and forming pockets between them, of plungers arranged in the pockets, a plate closing the opening in the casing, a cam arranged on the plate centrally of the wheel and coöperating with the plungers and means for adjustably supporting it on the casing.

11. In an agricultural implement, the combination with a frame, wheels supporting it and a shaft driven by one of the wheels and extending transversely of the frame, of seeding mechanism adjustable on the frame comprising a casing, a wheel arranged therein connected to the shaft and movable longitudinally thereon having seed pockets, plungers fitting said pockets and a cam secured to the casing surrounding the shaft and coöperating with the plungers.

12. The combination with a hopper, of distributing mechanism connected thereto embodying a throat opening into the hopper, a feed wheel receiving material from the throat and having a width less than said throat, and a brush within said throat, coöperating with the wheel and extending beyond the opposite side faces of the latter to coöperate with the bottom of the throat on opposite sides of the wheel.

13. The combination with a hopper having a concave bottom, of a distributing mechanism connected thereto embodying a throat opening into the hopper at one side of the concave bottom and a feed wheel receiving material from the throat, and having a width less than the width of the throat, an inclined plate arranged in the hopper at the bottom of the latter and projecting into the throat over the feed wheel in spaced relation to the side walls of the throat to permit material to feed to the feed wheel from opposite sides of the plate.

FREDRICK W. MILLER.

Witnesses:
G. WILLARD RICH,
FLORENCE E. FRANCK.